US008601395B2

(12) United States Patent
Wong et al.

(10) Patent No.: US 8,601,395 B2
(45) Date of Patent: Dec. 3, 2013

(54) DISPLAYING A DATA SET

(75) Inventors: Quinn Wong, Wiesloch (DE); Timon Schubert, Heidelberg (DE)

(73) Assignee: SAP AG, Walldorf (DE)

( * ) Notice: Subject to any disclaimer, the term of this patent is extended or adjusted under 35 U.S.C. 154(b) by 212 days.

(21) Appl. No.: 12/963,213

(22) Filed: Dec. 8, 2010

(65) Prior Publication Data

US 2012/0151417 A1 Jun. 14, 2012

(51) Int. Cl.
*G06F 3/00* (2006.01)

(52) U.S. Cl.
USPC ............ 715/851; 715/968; 707/803; 707/805

(58) Field of Classification Search
USPC .......................... 715/851, 968; 707/803, 805
See application file for complete search history.

(56) References Cited

U.S. PATENT DOCUMENTS

| 7,418,670 B2 * | 8/2008 | Goldsmith ................... 715/810 |
| 2006/0074967 A1 * | 4/2006 | Shaburov ..................... 707/102 |
| 2006/0116994 A1 * | 6/2006 | Jonker et al. ..................... 707/3 |
| 2010/0257438 A1 * | 10/2010 | Becerra et al. ................ 715/204 |
| 2010/0283743 A1 * | 11/2010 | Coddington .................. 345/173 |

OTHER PUBLICATIONS

'Nested join on same table (tree structure)' [online]. Stack Overflow, 2009, [retrieved on Dec. 8, 2010]. Retrieved from the Internet: http://stackoverflow.com/questions/1782389/nested-join-on-same-table-tree-structure>, 3 pages.
'Predictive Knowledge & Data Mining' [online]. Rosella, 2005, [retrieved on Dec. 8, 2010]. Retrieved from the Internet: <URL: http://www.roselladb.com/cross-table.htm>, 1 page.
Query Design: BEx Query Designer [online]. SAP Library, [retrieved on Dec. 8, 2010]. Retrieved from the Internet: <URL: http://help.sap.com/saphelp_nw04/helpdata/en/9d/76563cc368b60fefe10000000a114084/content.htm>, 2 pages.
'SAP NetWeaver Business Intelligence' [online]. Wikipedia, [retrieved on Dec. 8, 2010]. Retrieved from the Internet: <URL: http://en.wikipedia.org/wiki/SAP_NetWeaver_Business_Intelligence>, 4 pages.
'The Basic MDX Query (MDX)' [online]. Microsoft, 2010, [retrieved on Dec. 8, 2010]. Retrieved from the Internet: <URL: http://msdn.microsoft.com/en-us/library/ms144785.aspx>, 3 pages.

* cited by examiner

*Primary Examiner* — Kieu Vu
*Assistant Examiner* — Andrew Chung
(74) *Attorney, Agent, or Firm* — Fish & Richardson P.C.

(57) ABSTRACT

A computer-implemented method for displaying a data set includes: receiving, in a device and from a backend system, a data set with multiple dimensions generated by a query performed on a database, the query stored in the backend system; assigning, to an innermost-dimension area displayed on the device, only member-data pairs of an innermost dimension that are associated with a first member in another dimension; receiving an input that identifies a second member in the other dimension, the input generated with an input control assigned to the other dimension; and in response to the input, instead assigning to the displayed innermost-dimension area only member-data pairs of the innermost dimension that are associated with the second member in the other dimension.

20 Claims, 6 Drawing Sheets

DISPLAYING A DATA SET

TECHNICAL FIELD

This document relates to displaying a data set.

BACKGROUND

Some computer systems are configured to perform functions relating to enterprise resources planning (ERP) and are therefore referred to as ERP systems. An ERP system can serve many purposes, such as supply chain management, customer relations management, and analysis and reporting on transactional data.

Some databases are designed with multidimensional data structures. These multidimensional databases are commonly used for data analysis which is usually referred to as online analytical processing (OLAP). Data from the ERP system's relational database can be transported to the OLAP system's multidimensional database via a so called ETL process (Extraction, Transformation and Loading). Queries can be defined and executed on the multidimensional database and return one or more tables as a result. Such tables can be merged into a single table with multiple column and row headers and a data section, which is referred to as result set or cross table.

Usually queries are defined once for a specific use and then stored on the backend system for other users to use. In most cases those predefined queries are the basis for other users' daily work and the work spent on query formulation is hence considered to be an investment. Reusing these queries in multiple scenarios is desirable as the cost of defining the queries can be spread and the users who have become familiar with the queries and the way that these queries present the data do not have alter their way of working.

SUMMARY

The invention relates to displaying a data set.

In a first aspect, a computer-implemented method for displaying a data set includes: receiving, in a device and from a backend system, a data set with multiple dimensions generated by a query performed on a database, the query stored in the backend system; assigning, to an innermost-dimension area displayed on the device, only member-data pairs of an innermost dimension that are associated with a first member in another dimension; receiving an input that identifies a second member in the other dimension, the input generated with an input control assigned to the other dimension; and in response to the input, instead assigning to the displayed innermost-dimension area only member-data pairs of the innermost dimension that are associated with the second member in the other dimension.

In a second aspect, a computer program product is tangibly embodied in a computer-readable storage medium and includes instructions that when executed by a processor perform a method for displaying a data set. The method includes: receiving, in a device and from a backend system, a data set with multiple dimensions generated by a query performed on a database, the query stored in the backend system; assigning, to an innermost-dimension area displayed on the device, only member-data pairs of an innermost dimension that are associated with a first member in another dimension; receiving an input that identifies a second member in the other dimension, the input generated with an input control assigned to the other dimension; and in response to the input, instead assigning to the displayed innermost-dimension area only member-data pairs of the innermost dimension that are associated with the second member in the other dimension.

In a third aspect, a device includes: (i) a processor; (ii) a display device; (iii) a computer readable storage medium including: a data set that is received from a backend system and has multiple dimensions generated by a query performed on a database, the query stored in the backend system; and display instructions that when executed cause the processor to assign, to an innermost-dimension area on the display device, only member-data pairs of an innermost dimension that are associated with a first member in another dimension; and (iv) an input control assigned to the other dimension, wherein in response to the input control generating an input that identifies a second member in the other dimension, the display instructions cause the processor to instead assign, to the displayed innermost-dimension area, only member-data pairs of the innermost dimension that are associated with the second member in the other dimension.

Implementations can include any or all of the following features. The input control is labeled with the first member in the other dimension, and provides navigation to all other members in the other dimension. The input control includes a displayed menu that has all the other members in the other dimension, wherein selection of any of the other members in the menu causes only member-data pairs of that member to be assigned to the innermost-dimension area. The data set includes at least one member in the innermost dimension that belongs to multiple member-data pairs, and wherein data of the multiple member-data pairs are displayed in columns in the innermost-dimension area, the method further comprising providing navigation between at least two of the columns while the member remains visible in the innermost-dimension area. The method further includes receiving an input generated by a user who performs a zoom-out gesture on a touchscreen of the device, and updating the innermost-dimension area for a next outer dimension in response to the input. The method further includes receiving an input generated by a user who performs a zoom-in gesture on a touchscreen of the device, and updating the innermost-dimension area for a next inner dimension in response to the input.

Implementations can provide any or all of the following advantages. Access to database information can be improved by a user interface on a mobile device that focuses on the most relevant data aspects. Use of devices with limited screen space can be improved. A display technique can allow pre-existing database queries to be used also when query results should be displayed on mobile devices.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which a device with limited screen space can adapt the presentation of an extensive data set that results from a database query. In examples below, the device focuses on an innermost dimension of the data set in the display area and provides only navigation tools to every other dimension of the data set. This allows the user to effectively use the limited screen space and focus on the aspects of the data that are most relevant to the user, while the remaining data-set dimensions remain available and navigable without unnecessarily blocking screen space.

Figure 1:
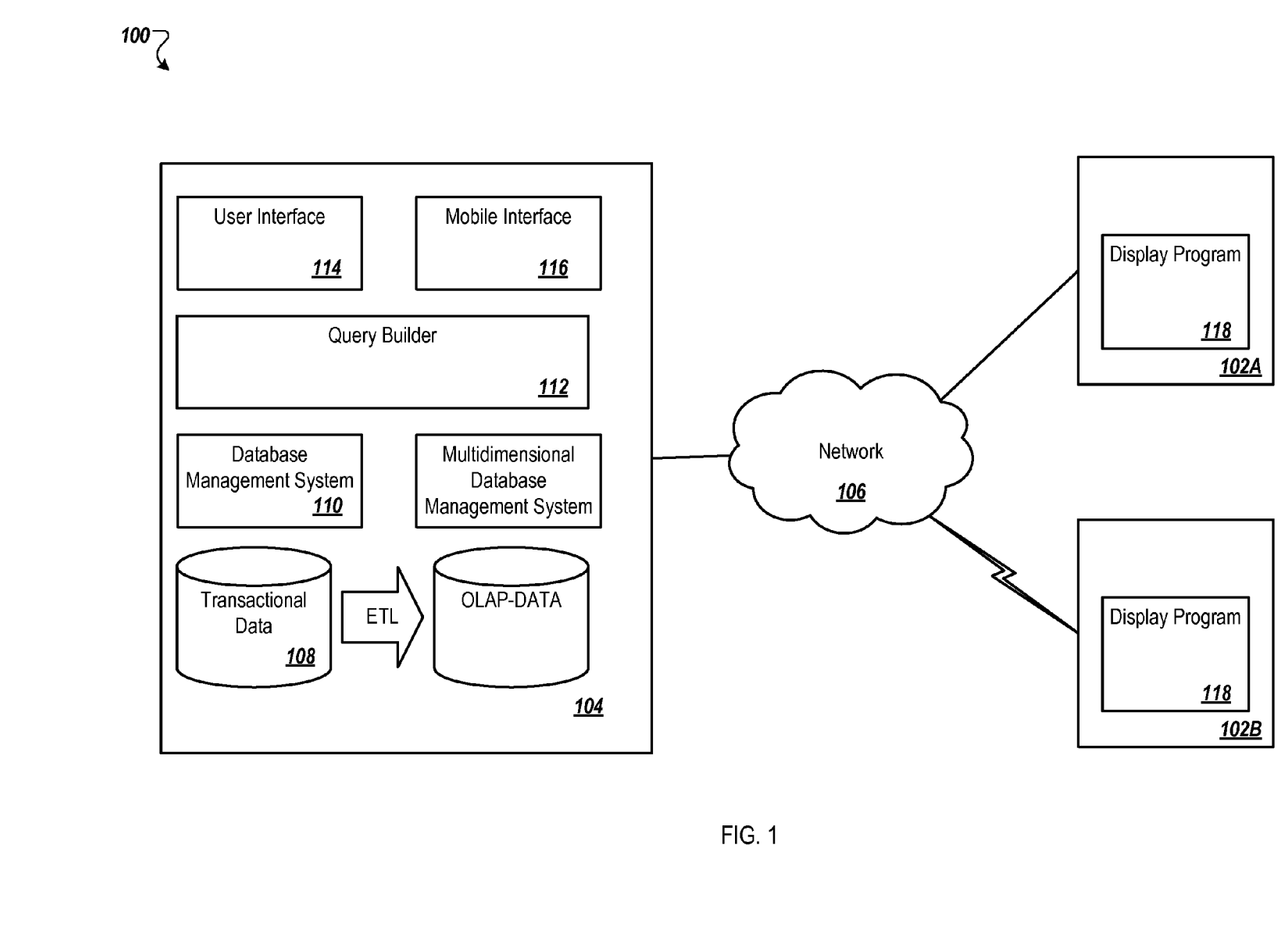
FIG. 1 shows a block diagram of a system that can generate a data set for display on one or more devices.

FIG. 1 shows a block diagram of a system 100 that can generate a data set for display on one or more devices 102. The system 100 includes a backend system 104 that can communicate with each of the devices 102 through one or more networks 106, for example the Internet. The backend system 104 can be any kind of computer system, for example an OLAP system that is loaded with transactional data from an ERP system.

Here, the backend system 104 includes at least one database 108 with transactional data. In some implementations, the backend system 104 manages and documents all business transactions for a large organization, and this business data is organized and stored in the database 108. Here, the database 108 contains all of the organization's sales records for previous years, to name just one example. Any suitable type of database compatible with the backend system 104 can be used.

The backend system 104 includes a database management system 110 that manages at least the transactional data in the database 108. For example, the database management system 110 interfaces with a sales application (not shown) in the backend system and ensures that the database 108 is properly updated with received transactional information. Any suitable type of database management system compatible with the database 108 can be used.

The database 108 can be accessed, directly or indirectly, by at least one query builder component 112. The query builder component 112 allows a user to formulate different queries and run them on the transactional data in the database 108. In some implementations, the query builder component 112 provides for query formulation by drag-and-drop operations. In some implementations, the organization defines one or more queries that are relevant to the business, and stores these queries in the backend system 104 so that they can be executed multiple times without having to re-create the queries. Any suitable type of query builder component compatible with the database 108 can be used. Here, the query builder component 112 is included in the backend system 104, but in other implementations can be located in another system.

The backend system 104 includes at least one user interface 114 by which users can interact with one or more backend components. For example, the user interface 114 can support the user in formulating queries using the query builder component 112. As another example, the user interface 114 can display (or present in some other way) search results from one or more database queries. For example, the data set returned by the query can be visualized to the user in a spreadsheet format. In some implementations, the user interface 114 and the query builder component 112 facilitate use of one or more clients (e.g., a personal computer) to interact with the backend system, for example in a web-based environment using one or more suitable communication protocols. In such implementations, the user can connect to the backend system 104 using the client, and generate a display of database information based on one or more executed queries.

The backend system 104 also includes one or more mobile interfaces 116. The mobile interface makes some or all functions of the backend available to at least one mobile device, such as any or all of the devices 102. Here, a device 102A is currently connected to the backend system 104 by a wired network connection, and a device 102B is connected by a wireless network connection. Any suitable type of device can be used, including, but not limited to: smartphones, personal digital assistants, portable computers, handheld personal computers, netbooks, and combinations thereof.

In some implementations, the device(s) 102 can connect to the backend system 104 using the mobile interface 116 and initiate any or all predefined database queries stored in the backend system. For example, one or more such stored database queries were created in the context of non-mobile devices and in some instances the data results require a considerable amount of screen space to be displayed in their entirety. The devices 102 here have a display program 118 that generates a rendering of the data results that is more suitable for a display with limited screen space. Examples of such rendering will now be described.

Figure 2:
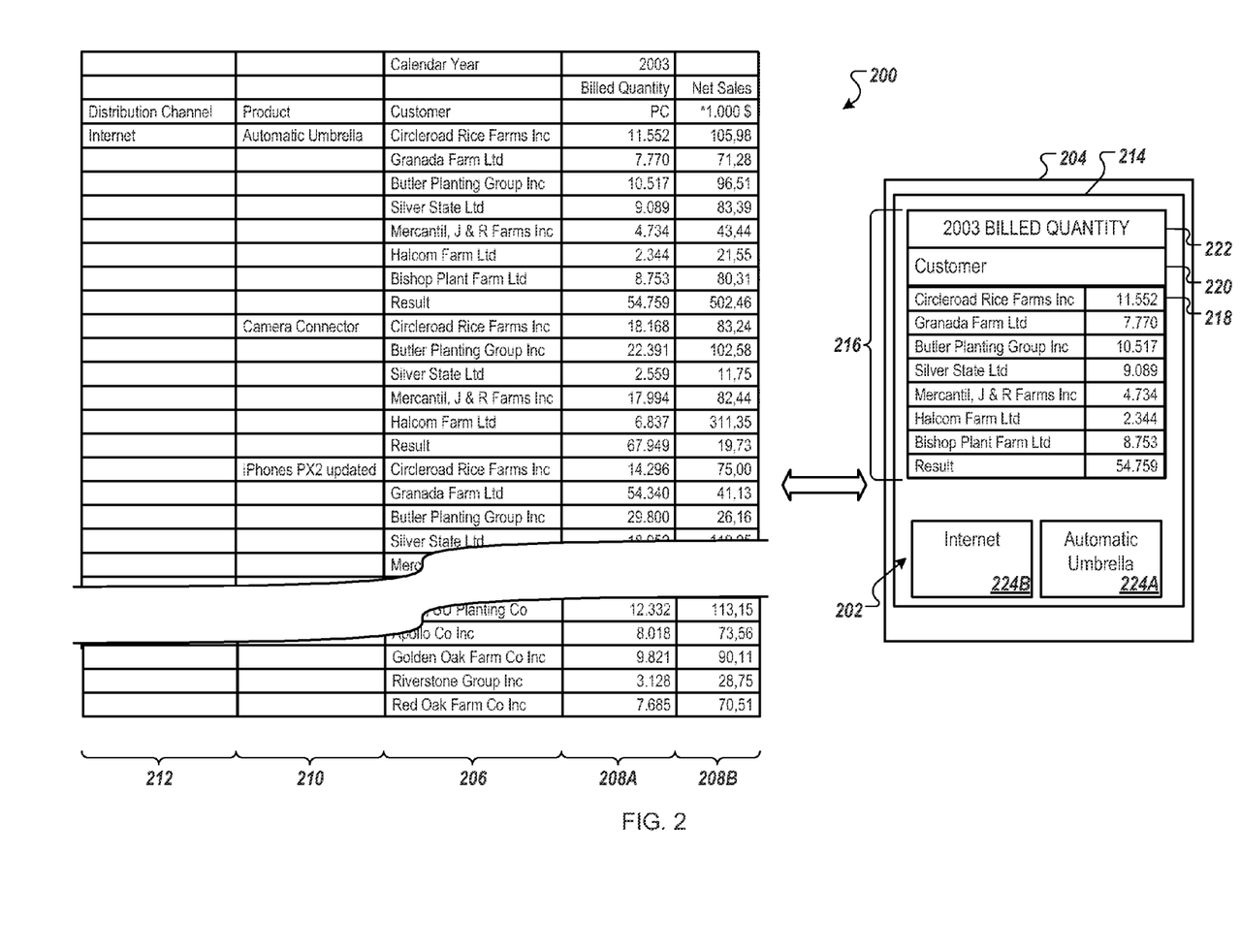
FIG. 2 schematically shows a data set and a rendering of the data set on a device.

FIG. 2 schematically shows a data set 200 and a rendering 202 of the data set on a device 204. While the data set 200 has information organized in a way that may be workable and useful on a monitor of a personal computer, the rendering 202 has been generated to focus on the information that is most pertinent to the user. The device 204 can be the devices 102A and/or 102B (FIG. 1), and the rendering 202 can be generated by the display program 118 (FIG. 1).

Beginning with the data set 200, it contains sales information for one organization over a number of years. The data is organized in dimensions according to how the database query was formulated that obtained this data set. The following are two exemplary ways of obtaining data for displaying an innermost dimension on a mobile device. First, the query can be executed on the backend system the way it was stored, the complete result set can be transferred to the client device, which only renders the section that the user wishes to see. Such an offline navigation requires fewer round trips, which can provide a more responsive client and more fluent user interaction. On the other hand, more data is transferred initially.

Second, the user can indicate what section he or she wants to see. The client can automatically modify the query definition and sends the query to the backend where it is executed. The result set, having only the desired section, is transferred to the client and then rendered. With this approach less data is transferred initially, but it does not provide offline navigation and more round trips may occur.

Here, the data set 200 reflects monetary amounts associated with respective customers. For example, an innermost dimension 206 relates to "Customers" and includes a number of members that correspond to individual customers, such as "Circleroad Rice Farms Inc." and "Granada Farm Ltd."

The monetary data is here organized in columns by year and type. For example, for the year 2003, Billed Quantity amounts are listed in a column 208A and Net Sales amounts are listed in a column 208B. Each member is paired with at least one data portion in the data set. For example, the member Circleroad Rice Farms Inc. is paired with "$11,552" in the column 208A and with "$105,98" in the column 208B. Similarly, each other member in the innermost dimension is paired with respective data according to year and type.

The members and data in the innermost dimension are grouped according to another dimension 210 that relates to "Product". For example, the seven topmost rows of the innermost dimension 206 contain data that relates to the product "Automatic umbrella," as indicated by a member in the dimension 210. Other rows contain data that relates to another product, for example "Camera Connector".

In turn, the members in the dimension 210 are grouped according to another dimension 212 that relates to "Distribution Channel". For example, the four topmost members of the dimension 210 relate to the distribution channel "Internet," as indicated by a member in the dimension 212. Other members of the dimension 210 relate to another distribution channel, for example "Fax".

For example, the query that generates the data set 200 can be created as follows, using drag-and-drop operations. The user drags an object representing a customer dimension and drops it in a location that signifies innermost dimension. Similarly, the user drags an object representing product and drops it in a location that specifies how the customer data should be grouped (i.e., it should here be grouped by product). Also, the user drags an object representing a distribution-channel dimension and drops it in a location that specifies how the product data should be grouped (i.e., it should here be grouped by distribution channel). Usually the query is formulated so that the innermost dimension in the result contains the data that the user is most interested in, because the values for the individual members of this dimension are listed underneath each other, which makes them easily comparable.

That is, the data set 200 as here illustrated gives a comprehensive view of large amounts of data, and concisely indicates how the data is organized. Such a view can be useful when ample screen space is available, because the user can see a significant scope of the data without scrolling vertically or horizontally.

On most mobile devices, however, screen space is more limited, and the data set 200 is too large to be displayed at once. Moreover, the significant vertical separation between some members—for example those in the dimension 212—can make navigation within the data set 200 difficult or slow. Here, the device 204 is therefore configured to generate a representation of the data set 200 that is more useful on a small screen, namely the rendering 202. For example, the rendering 202 is generated by the display program 118 (FIG. 1) on any type of display device 214. Executing the query will return the whole data set 200. However, a user may be interested in only one or more sections of the data set. This can either be done by automatically (i.e., without explicit reformulation by the user) altering the query so that it returns only the desired section, or by post-processing the data set and displaying only the desired section.

The rendering 202 here includes an innermost-dimension area 216 that is used for presenting those aspects of the data set that are most relevant to the user. The innermost-dimension area 216 includes multiple pairs 218 of members and data; a dimension header 220 indicates that "Customer" is the innermost dimension of this data set; and a column header 222 indicates that the data belongs to the "2003 Billed Quantity" column, which is referred to as column 208 in the data set 200. Only some of the member-data pairs 218 are currently visible in the innermost-dimension area 216, and the user navigates upward and/or downward to see the rest. For example, navigation is triggered by any of: making a gesture on a touch-sensitive screen; clicking or otherwise activating a virtual button displayed on the screen; or by pressing a physical button on the device.

The rendering 202 can include one or more controls 224 for navigation between any or all dimensions in the data set. For example, the controls 224 are generated as virtual buttons on the display device 214 and can be activated with a cursor or by touching the display device with a finger or a stylus. Here, a control 224A corresponds to the dimension 210, which is omitted from the innermost-dimension area 216. The control 224A is labeled "Automatic umbrella" to indicate which of the "Product" dimensions is associated with the presented data.

As another example, a control 224B corresponds to the dimension 212, which is also omitted from the innermost-dimension area 216. The control 224B is labeled "Internet" to indicate which of the "Distribution Channel" dimensions is associated with the presented data. Accordingly, the controls 224 give the user valuable indication of a remainder of the data set 200 without cluttering the display device 214 or requiring inconvenient scrolling.

Figure 3A:
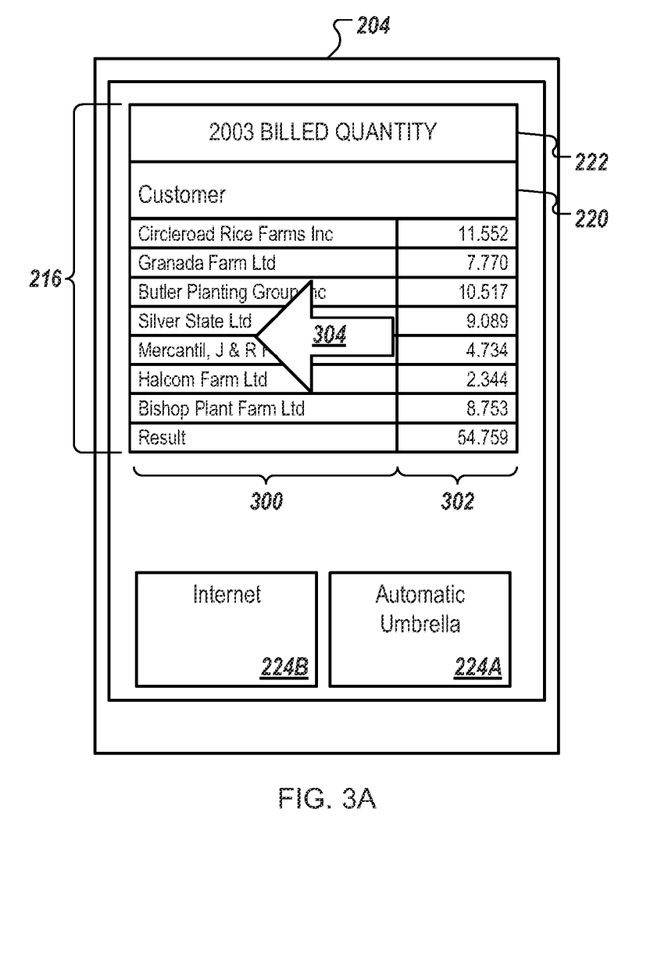
FIGS. 3A-B show a display of the device in navigation between columns.
Figure 3B:
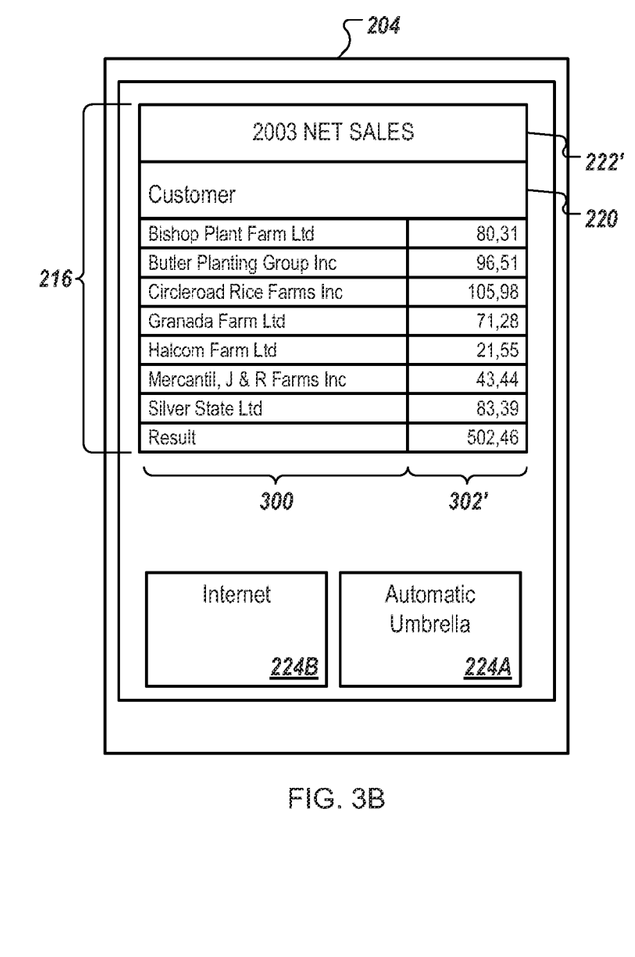

FIGS. 3A-B show a display of the device 204 in navigation between columns. The innermost-dimension area 216 currently includes information organized in two columns: A column 300 with customers (i.e., members) from the innermost dimension 206 (FIG. 2) and a column 302 with billed quantities (i.e., data) from the column 202A (FIG. 2). The dimension header 220 indicates that each shown member is a customer, and the column header 222 indicates that the displayed data are billed quantities for 2003.

Assume now that the user wishes to inspect additional data for the customers in the column 300. Particularly, the user is interested in the respective net sales for these customers for the same year. The user therefore makes a navigation input that triggers the device 204 to display other data in the innermost-dimension area 216. The input is made by performing a gesture on a touch-sensitive display, for example by swiping a fingertip or a stylus in a direction generally from right to left, as indicated by arrow 304. As other examples, the input is made using a virtual or physical button on the device. The navigation will replace the data in the column 302 with other data values that are also paired with the members in the column 300.

FIG. 3B shows that a column 302' contains net sales values for the members in the column 300, the net sales values obtained from the column 208B (FIG. 2). Similarly to before the current navigation, the dimension header 220 indicates that each shown member is a customer. However, a column header 222' now indicates that the displayed data are net sales for 2003. That is, in this example, the navigation proceeds one column toward the right in the data set 200 (FIG. 2). In other situations, navigation can be done in either a left or right direction, and/or by multiple columns at once.

The controls 224 are available, before and after the navigation, for switching to another product dimension and/or to another distribution-channel dimension. That is, the controls 224 continue to inform the user about the greater context to which the information in the innermost-dimension area 216 belongs, and to be available for navigation to one or more different contexts, in which situations the information in the innermost-dimension area 216 is updated accordingly.

Figure 4A:
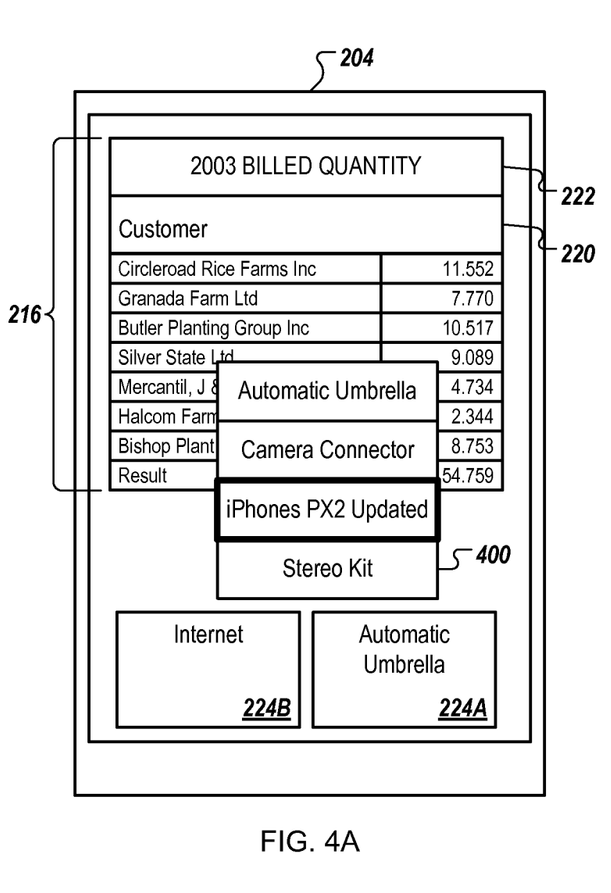
FIGS. 4A-B show a display of the device in navigation between dimensions.
Figure 4B:
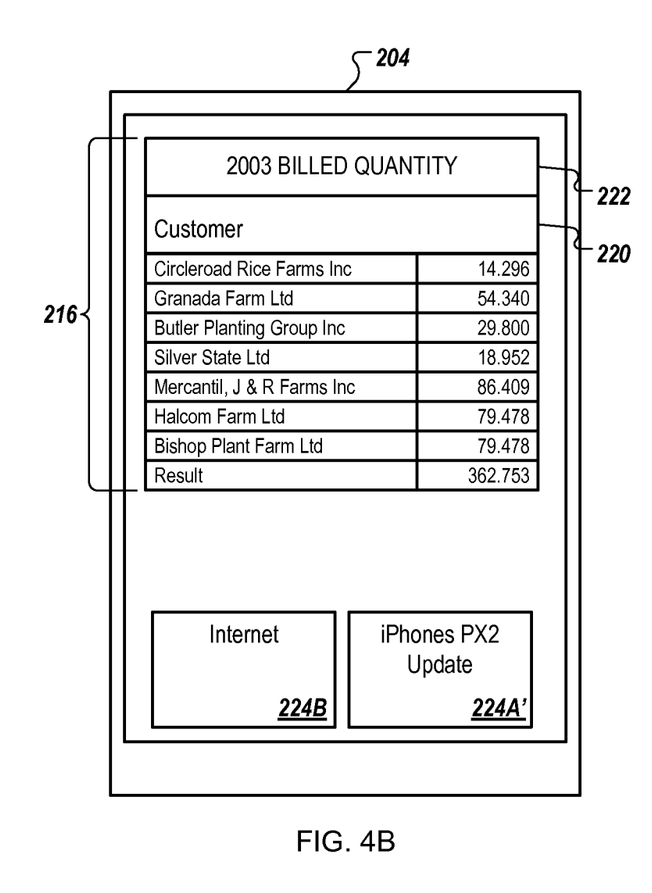

FIGS. 4A-B show a display of the device 204 in navigation between dimensions. In FIG. 4A, the user is currently inspecting the innermost-dimension area 216 when it presents the 2003 billed quantities (as indicated by the column header 222) for the customer dimension (i.e., as indicated by the dimension header 220). Particularly, the customer data relates to the product dimension "Automatic umbrella" as indicated by the control 224A, and to the "Internet" distribution-channel dimension, as indicated by the control 224B. Assume now that the user instead wishes to inspect the 2003 billed quantities for a different product. The user therefore activates the control 224A, which causes a menu 400 to be presented. The menu 400 specifies the members of the "Product" dimension for internet-distributed sales (i.e., members from the column 210 in FIG. 2). The user now chooses any of the members available in the menu—here, the product "iPhones PX2 Updated". The selection can be done by a touchscreen gesture or using a virtual or physical button on the device. This selection triggers a navigation in the product dimension to the selected item.

FIG. 4B shows the device 204 when the innermost-dimension area 216 has been updated according to the navigation. First, the column header 222 indicates that the presentation includes 2003 billed quantities, and the dimension header 220 specifies that the customer dimension is being shown. Also, the control 224B indicates that the presented data relates to internet distribution. However, a control 224A' indicates, regarding the product dimension, that the data in the innermost-dimension area 216 now instead relates to the selected "iPhones PX2 Updated" product. That is, the presented data is obtained from other rows in the data set 200 than before the navigation. The controls 224B and 224A' remain active and can be used to trigger new navigation(s).

Similarly, the user can employ the control 224B to navigate among the members of that dimension, which in this implementation is the distribution channel. For example, activating the control 224B causes a menu similar to the menu 400 to be presented, which lists the distribution channels (e.g., internet, fax, etc.) for selection by the user.

Figure 5A:
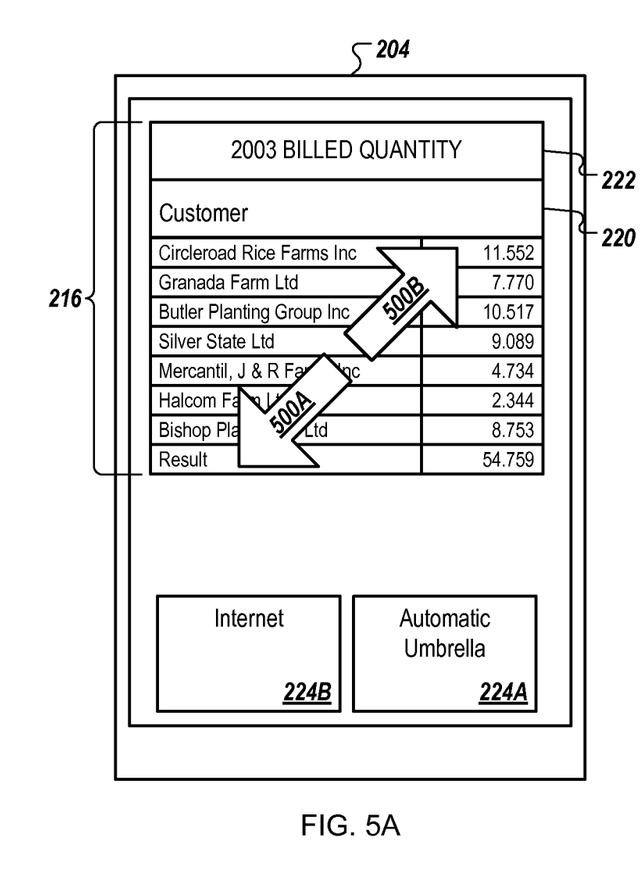
FIGS. 5A-B show a display of the device in a zoom-out navigation.
Figure 5B:
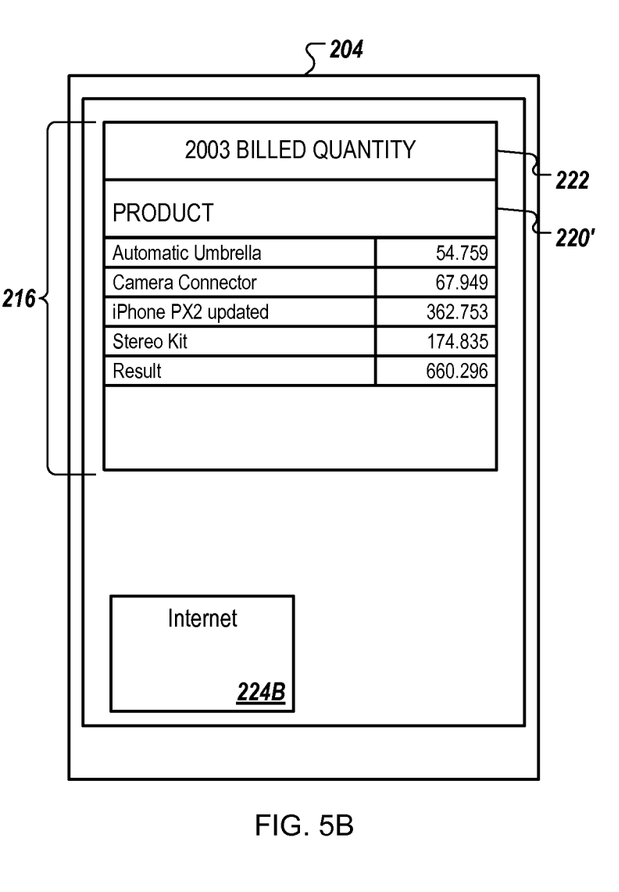

FIGS. 5A-B show a display of the device in a zoom-out navigation. In FIG. 5A, the innermost-dimension area 216 shows, similarly to the example in FIG. 2, internet-related 2003 billed quantities for specific customers of automatic umbrellas. Assume now that the user is interested in more closely inspecting the next outer dimension, which in this example would be the billed quantities for all products in the distribution channel Internet, independent of the customer identities. The user therefore initiates zoom-out navigation. In various implementations, the navigation can be initiated by performing a touchscreen gesture, or by activating a virtual or physical button on the device. For example, a "pinch"-like gesture is generated by swiping fingertips and/or styli in generally opposing directions, as indicated by arrows 500A and 500B.

FIG. 5B shows the device 204 where the innermost-dimension area 216 has been updated with the next outer dimension. This is reflected by the dimension header 220' which now reads Product instead of Customer. The zoom-out navigation can be repeated until the outermost dimension (in this example Distribution Channel) has been reached.

By a substantially reversed gesture, the user can perform zoom-in navigation to the next inner dimension. For example, the user makes an "expand"-like gesture by swiping fingertips and/or styli in directions generally opposite to those indicated by the arrows 500A and 500B. The user can repeat this zoom-in navigation until the user reaches the innermost dimension.

Figure 6:
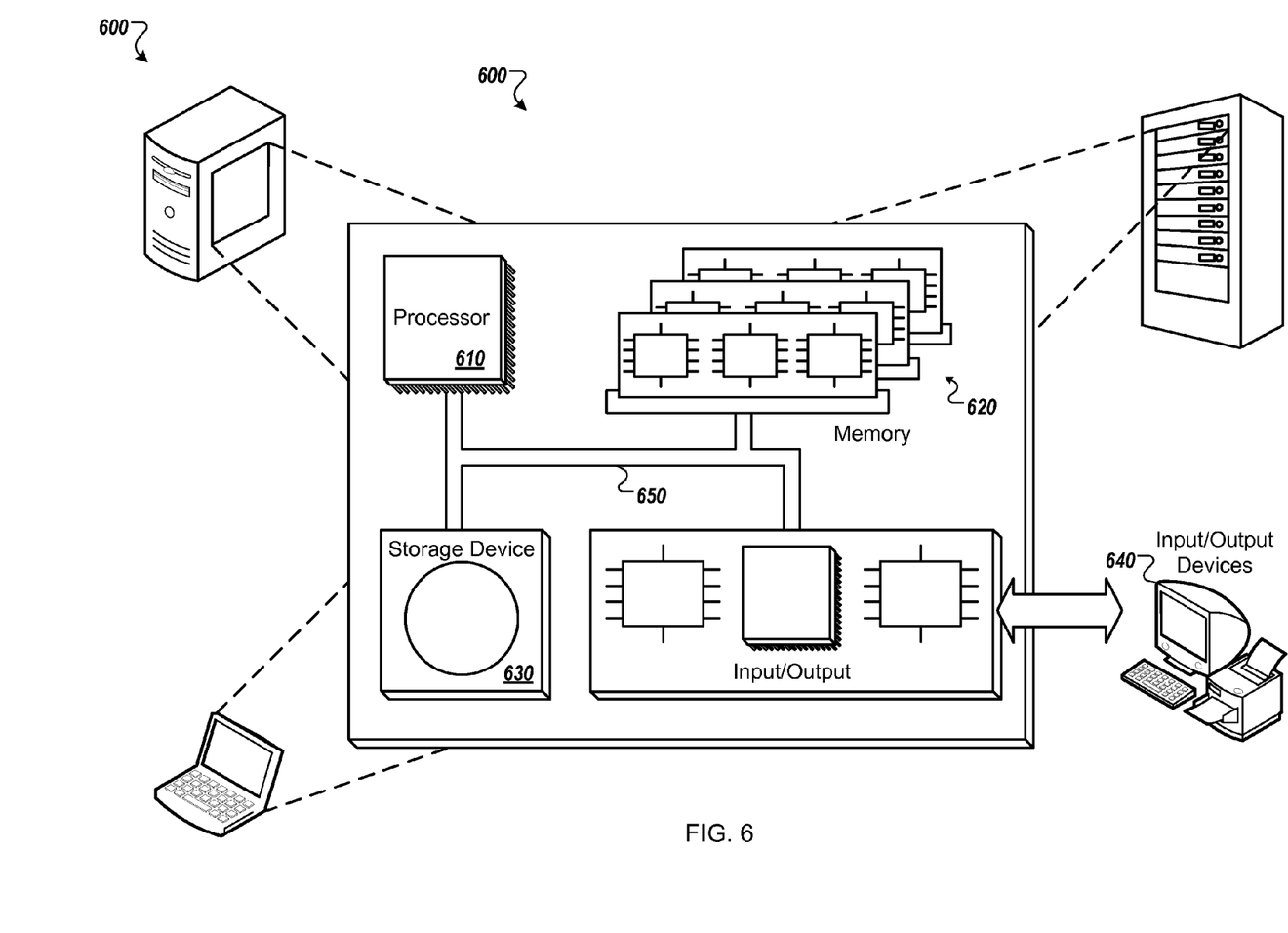
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640.

Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for displaying a data set, the method comprising:
    receiving, in a device and from a backend system, a data set with multiple dimensions generated by a query performed on a database, the query stored in the backend system;
    identifying, by the device, a first outer dimension of the multiple dimensions of the data set, the first outer dimension defined by a first class of data members that share a first common characteristic;
    identifying, by the device, an inner dimension of the multiple dimensions of the data set, the inner dimension defined by a second class of data members that share a second common characteristic that is different from the first common characteristic, each second-class data member being associated with at least one first-class data member and with respective information from the data set that indicates a metric for each second-class data member;
    generating, by the device, member-data pairs for a first group of the second-class data members that are associated with a first of the first-class data members, wherein the member-data pairs each include (i) a respective second-class data member, and (ii) the respective information from the data set that indicates the metric for the respective second-class data member;
    identifying other first-class data members that are different from the first of the first-class data members;
    displaying, by the device, (i) the member-data pairs for only the first group of the second-class data members and (ii) an input control that includes a mechanism for selecting one or more of the other first-class data members;
    receiving, by the device, input that corresponds to a selection of a second of the first-class data members from the input control; and
    in response to receiving the selection of the second of the first-class data members, displaying member-data pairs for only a second group of the second-class data members that are associated with the second of the first-class data members.

2. The computer-implemented method of claim 1, wherein the input control is labeled with the first of the first-class data members and provides navigation to multiple of the other first-class data members.

3. The computer-implemented method of claim 2, wherein the input control includes a menu that provides the multiple of the other first-class data members for display.

4. The computer-implemented method of claim 1, wherein:
    the data set includes one or more second-class data members that are further associated with respective information from the data set that indicates a second metric for respective ones of the one or more second-class data members;
    the member-data pairs and the metrics are displayed by the device in first and second columns, respectively; and
    the method further comprises providing navigation between display of the metric and the second metric in the second column while the member-data pairs remain displayed in the first column.

5. The computer-implemented method of claim 1, further comprising:
    identifying, by the device, a second outer dimension of the multiple dimensions of the data set, the second outer dimension defined by a third class of data members that share a third common characteristic that is different than the first and second common characteristics, wherein each first-class data member is associated with at least one third-class member;
    generating, by the device, second member-data pairs for a first group of the first-class data members that are associated with a first of the third-class data members, wherein the second member-data pairs each include (i) a respective first-class data member, and (ii) respective information from the data set that indicates a second metric for the respective first-class data member;
    receiving, by the device, input that corresponds to a zoom-out gesture having been performed on a touchscreen of the device; and
    in response to receiving the input that corresponds to the zoom-out gesture, displaying the second member-data pairs for only the first group of the first-class data members that are associated with the first of the third-class data members.

6. The computer-implemented method of claim 5, further comprising:
    receiving, by the device, input that corresponds to a zoom-in gesture having been performed on the touchscreen of the device; and
    in response to receiving the input that corresponds to the zoom-in gesture, displaying the member-data pairs for only a particular group of the second-class data members that are associated with one of the first-class data members.

7. The computer-implemented method of claim 1, wherein:
    the data set is organized in the multiple dimensions according to how the query was formulated;
    the data set reflects monetary amounts associated with respective customers;

a customer dimension includes the customers;
a product dimension includes products;
a distribution channel dimension includes distribution channels; and
one of the customer, product and distribution channel dimensions has been defined as the inner dimension.

8. The computer-implemented method of claim 7, wherein:
a user drags a first object representing one of the customer, product and distribution channel dimensions and drops the object in a location that signifies the inner dimension;
the user drags a second object representing another one of the customer, product and distribution channel dimensions and drops it in another location that specifies how data for the first object should be grouped; and
the user drags a third object representing yet another one of the customer, product and distribution channel dimensions and drops it in yet another location that specifies how data for the second object should be grouped.

9. The computer-implemented method of claim 8, wherein:
the customer dimension is the inner dimension;
the product dimension is the first outer dimension such that the customers in the customer dimension are grouped according to the products;
the products are grouped according to the distribution channels;
the input control is assigned to the product dimension and indicates a first product;
before the input is received, only those of the customers that are associated with the first product are displayed in the displayed member-data pairs;
after the input is received, only those of the customers that are associated with a second product, separate from the first product, are displayed among the displayed member-data pairs; and
a second input control is displayed that is assigned to the distribution channel dimension.

10. A computer program product embodied in a non-transitory computer-readable storage medium and comprising instructions that when executed by a processor perform a method for displaying a data set, the method comprising:
receiving, in a device and from a backend system, a data set with multiple dimensions generated by a query performed on a database, the query stored in the backend system;
identifying, by the device, a first outer dimension of the multiple dimensions of the data set, the first outer dimension defined by a first class of data members that share a first common characteristic;
identifying, by the device, an inner dimension of the multiple dimensions of the data set, the inner dimension defined by a second class of data members that share a second common characteristic that is different from the first common characteristic, each second-class data member being associated with at least one first-class data member and with respective information from the data set that indicates a metric for each second-class data member;
generating, by the device, member-data pairs for a first group of the second-class data members that are associated with a first of the first-class data members, wherein the member-data pairs each include (i) a respective second-class data member, and (ii) the respective information from the data set that indicates the metric for the respective second-class data member;
identifying other first-class data members that are different from the first of the first-class data members;
displaying, by the device, (i) the member-data pairs for only the first group of the second-class data members and (ii) an input control that includes a mechanism for selecting one or more of the other first-class data members;
receiving, by the device, input that corresponds to a selection of a second of the first-class data members from the input control;
in response to receiving the selection of the second of the first-class data members, displaying member-data pairs for only a second group of the second-class data members that are associated with the second of the first-class data members.

11. The computer program product of claim 10, wherein the input control is labeled with the first of the first-class data members and provides navigation to multiple of the other first-class data members.

12. The computer program product of claim 11, wherein the input control includes a menu that provides the multiple of the other first-class data members for display.

13. The computer program product of claim 10, wherein:
the data set includes one or more second-class data members that are further associated with respective information from the data set that indicates a second metric for respective ones of the one or more second-class data members;
the member-data pairs and the metrics are displayed by the device in first and second columns, respectively; and
the method further comprises providing navigation between display of the metric and the second metric in the second column while the member-data pairs remain displayed in the first column.

14. A device comprising:
(i) a processor;
(ii) a display device;
(iii) a computer readable storage medium including:
a data set that has been received from a backend system and that includes multiple dimensions generated by a query performed on a database, the query stored in the backend system; and
display instructions that when executed cause the processor to perform operations comprising:
identifying a first outer dimension of the multiple dimensions of the data set, the first outer dimension defined by a first class of data members that share a first common characteristic;
identifying an inner dimension of the multiple dimensions of the data set, the inner dimension defined by a second class of data members that share a second common characteristic that is different from the first common characteristic, each second-class data member being associated with at least one first-class data member and with respective information from the data set that indicates a metric for each second-class data member;
generating member-data pairs for a first group of the second-class data members that are associated with a first of the first-class data members, wherein the member-data pairs each include (i) a respective second-class data member, and (ii) the respective information from the data set that indicates the metric for the respective second-class data member;
identifying other first-class data members that are different from the first of the first-class data members;

causing the display device to display (i) the member data pairs for only the first group of the second-class data members and (ii) an input control that includes a mechanism for selecting one or more of the other first-class data members; and in response to receiving input that corresponds to a selection of a second of the first-class data members from the input control, causing the display device to display member-data pairs for only a second group of the second-class data members that are associated with the second of the first-class data members.

15. The device of claim 14, wherein the input control is labeled with the first of the first-class data members, and provides navigation to multiple of the other first-class data members.

16. The device of claim 15, wherein the input control includes a menu that provides the multiple of the other first-class data members for display.

17. The device of claim 14, wherein:

the data set includes one or more second-class data members that are further associated with respective information from the data set that indicates a second metric for respective ones of the one or more second-class data members;

the member-data pairs and the metrics are displayed by the device in first and second columns, respectively; and the operations further comprise providing navigation between display of the metric and the second metric in the second column while the member-data pairs remain displayed in the first column.

18. The device of claim 14, wherein the display device includes a touchscreen, and wherein the operations further comprise:

identifying a second outer dimension of the multiple dimensions of the data set, the second outer dimension defined by a third class of data members that share a third common characteristic that is different than the first and second common characteristics, wherein each first-class data member is associated with at least one third-class member;

generating second member-data pairs for a first group of the first-class data members that are associated with a first of the third-class data members, wherein the second member-data pairs each include (i) a respective first-class data member, and (ii) respective information from the data set that indicates a second metric for the respective first-class data member; and receiving input that corresponds to a zoom-out gesture having been performed on a touchscreen of the device; and in response to receiving input that corresponds to a zoom-out gesture having been performed on the touchscreen of the display device, causing the display device to display the second member-data pairs for only the first group of the first-class data members that are associated with the first of the third-class data members.

19. The device of claim 18, wherein the operations further comprise causing, in response to receiving input that corresponds to a zoom-out gesture while displaying the second member-data pairs, the display device to display the member-data pairs for only a particular group of the second-class data members that are associated with one of the first-class data members.

20. The device of claim 14, wherein the device is a handheld mobile device where the received data set exceeds an available screen space.

\* \* \* \* \*